United States Patent
Gerstenberger et al.

(10) Patent No.: US 10,293,445 B2
(45) Date of Patent: May 21, 2019

(54) HANDHELD WORK APPARATUS HAVING AN ELECTRIC MOTOR AND METHOD FOR ACTIVATING THE SAME

(71) Applicant: Andreas Stihl AG & Co. KG, Waiblingen (DE)

(72) Inventors: Oliver Gerstenberger, Ditzingen (DE); Florian Hoche, Besigheim (DE); Kay-Steffen Gurr, Heilbronn (DE); Fabian Gwosdz, Schrondorf (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 441 days.

(21) Appl. No.: 15/266,988

(22) Filed: Sep. 15, 2016

(65) Prior Publication Data

US 2017/0072523 A1    Mar. 16, 2017

(30) Foreign Application Priority Data

Sep. 15, 2015   (DE) .......................... 10 2015 012 043

(51) Int. Cl.
  *B25F 5/00* (2006.01)
  *B23Q 11/00* (2006.01)
  *F16P 3/00* (2006.01)
(52) U.S. Cl.
  CPC ............ *B23Q 11/0078* (2013.01); *B25F 5/00* (2013.01); *F16P 3/00* (2013.01)
(58) Field of Classification Search
  CPC . B25F 5/00; B25F 5/001; B23Q 17/22; B23Q 5/10; B23Q 11/0078; B25B 23/147; B25D 16/00; B25D 2216/0023; B25D 2250/201; B25D 2250/221; F16P 3/148; F16P 3/00
  USPC .......... 173/162.1–162.2, 210, 170–171, 217; 30/167–321, 369–394
  See application file for complete search history.

(56) References Cited

U.S. PATENT DOCUMENTS

| 4,298,072 A | * | 11/1981 | Baker ....................... B25C 1/06 |
| | | | 173/13 |
| 5,440,215 A | * | 8/1995 | Gilmore ................ B23P 19/066 |
| | | | 173/178 |
| 7,658,237 B2 | | 2/2010 | Rudolf et al. |
| 8,869,912 B2 | * | 10/2014 | Roβkamp et al. ..... A01G 3/053 |
| | | | 173/217 |
| 8,890,449 B2 | | 11/2014 | Suzuki et al. |

(Continued)

*Primary Examiner* — Robert F Long
(74) *Attorney, Agent, or Firm* — Walter Ottesen, P.A.

(57) ABSTRACT

A handheld work apparatus has an electric motor and a voltage source for operating the motor. A manual actuation element provided on a handle of the apparatus is operated by a user and is provided for activating the motor. The actuation element is connected to a control unit which controls the energy supply from the source to the motor as a function of an operating signal of the actuation element. If the control unit is in a blocking state, the energy supply to the motor is blocked independently of the operating signal of the actuation element. After receiving a control signal, the control unit switches from the blocking state to a standby state to release an energy supply to the motor. The control signal is derived from a combination of an actuation stroke and an actuation time ($\Delta T_B$) of the actuation element. A method for activating the apparatus is also disclosed.

20 Claims, 4 Drawing Sheets

(56) References Cited

U.S. PATENT DOCUMENTS

| | | | |
|---|---|---|---|
| 9,160,261 B2 | 10/2015 | Nishikimi | |
| 9,769,990 B2* | 9/2017 | Koizumi | B25F 5/00 |
| 10,183,384 B2* | 1/2019 | Takano | B25F 5/00 |
| 2005/0127862 A1* | 6/2005 | Glasgow | B05C 17/00503 |
| | | | 318/280 |
| 2010/0071920 A1* | 3/2010 | Lau | B25F 5/00 |
| | | | 173/1 |
| 2010/0116863 A1* | 5/2010 | Suda | B25C 1/008 |
| | | | 227/8 |
| 2010/0180740 A1* | 7/2010 | Krapf | B23Q 11/0082 |
| | | | 83/72 |
| 2011/0062208 A1* | 3/2011 | Hlinka | B25C 1/008 |
| | | | 227/8 |
| 2011/0132959 A1* | 6/2011 | Hlinka | B25C 1/008 |
| | | | 227/8 |
| 2013/0175961 A1 | 7/2013 | Suzuki et al. | |
| 2014/0045653 A1* | 2/2014 | Atsumi | B25F 5/001 |
| | | | 477/115 |
| 2014/0174772 A1* | 6/2014 | Mandalka | B25F 5/02 |
| | | | 173/1 |
| 2014/0284070 A1* | 9/2014 | Ng | B25F 5/00 |
| | | | 173/2 |
| 2015/0034348 A1* | 2/2015 | Yoshida | B24B 23/028 |
| | | | 173/176 |
| 2015/0041164 A1* | 2/2015 | Sergyeyenko | B25B 21/008 |
| | | | 173/1 |
| 2015/0115857 A1* | 4/2015 | Sergyeyenko | H02P 27/00 |
| | | | 318/504 |
| 2015/0231779 A1 | 8/2015 | Kaupp et al. | |
| 2016/0031072 A1* | 2/2016 | Lim | B25F 5/001 |
| | | | 173/178 |
| 2016/0250738 A1* | 9/2016 | Leh | B25B 23/1475 |
| | | | 173/176 |
| 2018/0234034 A1* | 8/2018 | Manasseh | H02P 1/04 |

* cited by examiner

HANDHELD WORK APPARATUS HAVING AN ELECTRIC MOTOR AND METHOD FOR ACTIVATING THE SAME

CROSS REFERENCE TO RELATED APPLICATION

This application claims priority of German patent application no. 10 2015 012 043.3, filed Sep. 15, 2015, the entire content of which is incorporated herein by reference.

FIELD OF THE INVENTION

The invention relates to a method for activating a handheld work apparatus having an electric motor with a voltage supply for operating the electric motor. A manual actuation element or member is provided on a handle of the work apparatus and is to be operated by the user. The manual actuation element has the purpose of activating the electric motor. The actuation element is connected to a control unit, and the control unit controls the supply of energy from the voltage source to the electric motor as a function of an operating signal of the actuation element, and in a blocking state the control unit blocks the supply of electrical energy to the electric motor independently of the operating signal of the actuation element. After the reception of a control signal, the control unit switches from the blocking state into a standby state, in order to release a supply of energy to the electric motor. The invention also relates to a handheld work apparatus having an electric motor and a voltage supply for operating the electric motor. A manual actuation element or member is provided on a handle of the work apparatus. The manual actuation element is to be operated by the user and has the purpose of activating the work apparatus. The actuation element is connected to, and the control unit controls the supply of energy from the voltage source to the electric motor as a function of an operating signal of the actuation element, and in a blocking state blocks the supply of electrical energy to the electric motor independently of the operating signal of the actuation element. After the reception of a control signal, the control unit switches from the blocking state into a standby state in order to release a supply of energy to the electric motor.

BACKGROUND OF THE INVENTION

A work apparatus having an electric motor is known from U.S. Pat. No. 7,658,237. It is proposed herein to actuate one or more switching elements in a specific way within a specific time window in order to increase the operational safety of a power tool. In particular, a plurality of elastic touch surfaces are provided on the housing of the power tool and have to be actuated, for example, simultaneously or in a specific fashion one after the other in order to operate the power tool.

In practice it has become apparent that a plurality of switching elements which are provided for activating a power tool sometimes considerably disrupt the work flow; furthermore, given the arrangement of a plurality of switching elements there is an increased susceptibility to faults.

SUMMARY OF THE INVENTION

It is an object to increase the operational reliability in order to activate a handheld electric work apparatus without restricting the ease of operation for the user.

The object is, for example, achieved via a method for activating a handheld work apparatus having an electric motor, wherein a voltage source for operating the electric motor is provided and a manual actuation element which is to be operated by the user and has the purpose of activating the electric motor is provided on a handle of the work apparatus. The actuation element is connected to a control unit which controls the supply of energy from the voltage source to the electric motor as a function of an operating signal of the actuation element. In a blocking state the control unit blocks the supply of electrical energy to the electric motor independently of an operating signal of the actuation element, wherein after the reception of a control signal, the control unit switches from the blocking state into the standby state, in order to release a supply of energy to the electric motor. The control signal is derived from a combination of an actuation stroke of the actuation element and an actuation time of the actuation element, wherein a control signal is generated when within a predefined actuation time the actuation element has passed through a predefined actuation stroke beyond a stroke threshold in one actuation direction and has passed through a predefined return stroke counter to the actuation direction.

According to a method in accordance with an embodiment of the invention, the actuation element which is necessary in any case for activating the work apparatus is used, for the purpose of increasing the operational safety, to release the blocking state of the control unit only if a control signal is generated on the basis of the predefined actuation of the actuation element. The operational safety is achieved by virtue of the fact that not only does the actuation element have to pass through a specific actuation stroke in the actuation direction and a return stroke counter to the actuation direction but also that this movement must also be carried out within a predefined actuation time. The combination of a minimum actuation stroke beyond a stroke threshold, the predefined return stroke and the predefined time ensures a high level of operational safety against unintended switching on of the electric motor.

During the predefined return stroke, the stroke threshold is advantageously passed through counter to the actuation direction. The stroke threshold can easily be ensured via a switch, with the result that during the actuation stroke a first switching process of the switch, and during the return stroke a second switching process of the switch, are carried out. The time between the first switching process and the second switching process must then not be longer than the predefined actuation time.

In order to increase the operational safety further there is provision that the control signal for switching the control unit into the standby state is not generated until the stroke threshold has been passed through a second time in the actuation direction after the predefined return stroke. This means that the user must operate the actuation element in a very targeted fashion in order to trigger the standby state of the control unit only when the stroke threshold is passed through a second time in the actuation direction.

The control signal is not generated until the stroke threshold has been passed through a second time within a predefined interval time after the stroke threshold has been passed through counter to the actuation direction.

The actuation time for carrying out the actuation stroke and the return stroke is advantageously 50 milliseconds to 1 second; the actuation stroke can be 40% to 90% of the structural actuation stroke of the actuation element.

In order to increase the operational safety there is also provision that the control unit switches back into the blocking state if no—further—operating signal of the actuation element occurs within a predefined time period after the occurrence of the control signal. This predefined time period can be between 1 second and 5 seconds.

The control signal is generated only if a grip sensor which is arranged on the handle outputs a presence signal for the hand of a user. If the presence signal of the grip sensor goes out, the control unit switches back into the blocking state.

It can be advantageous to switch back the control unit into the blocking state only after the expiry of a predefined time period of, for example, 1 second after the presence signal of the grip sensor goes out. As a result, the user is provided with the possibility of gripping around the work apparatus with the hand which is carrying it without engaging with the control unit.

In one preferred embodiment, the actuation stroke of the actuation element and the predefined return stroke of the actuation element are of the same configuration.

In order to indicate the standby state of the control unit, a visual display can be provided which is embodied, in particular, as an LED.

The object can, for example, also be achieved by means of a handheld work apparatus having an electric motor. A voltage source for operating the electric motor is provided and a manual actuation element which is to be operated by the user and has the purpose of activating the work apparatus is provided on a handle of the work apparatus. The actuation element is connected to a control unit. The control unit controls the supply of energy from the voltage source to the electric motor as a function of an operating signal of the actuation element. In a blocking state of the control unit, the latter blocks the supply of electrical energy to the electric motor independently of the operating signal of the actuation element. Only if the control unit receives a control signal will the control unit change from the operating state into a standby state in order to release a supply of energy to the electric motor. This control signal is derived from a combination of an actuation stroke of the actuation element and an actuation time of the actuation element, wherein a control signal is generated when within a predefined actuation time the actuation element has passed through a predefined actuation stroke beyond a stroke threshold in one actuation direction, in order then to pass through a predefined return stroke counter to the actuation direction.

In order to indicate to the user that the stroke threshold has been passed through, there is provision that an increased spring force acts counter to the actuation element at the stroke threshold. The user can therefore feel the stroke threshold.

In another embodiment, a switching depression, which is assigned to the stroke threshold, is structurally formed in the housing of the handle. When the actuation element is pressed into the switching depression, the stroke threshold is exceeded.

A grip sensor for a user's hand is advantageously assigned to the actuation element, wherein in a particular embodiment the grip sensor is embodied as an actuation block for the actuation element.

In a simple way, the actuating travel of the actuation element can be detected by a switch and/or by a potentiometer. If only a switch is used, the fact that a specific actuating travel of the actuation element has been reached is indicated by the opening or closing of a contact of the switch. This can occur both in the case of the actuation stroke and in the case of the return stroke.

If, instead of the switch, a potentiometer is used to detect the actuating travel of the actuation element, a signal which corresponds to the actuating travel of the actuation element can be made available to the control unit; this signal can be, for example, a signal which is proportional to the actuating travel.

In one preferred embodiment, in order to detect the actuating travel of the actuation element a switch is combined with a potentiometer. A first actuating travel, for example a predefined actuation stroke, is indicated by opening or closing a contact of the switch; the further actuating travel, for example, a further actuation stroke, is then signaled to the control unit by a signal which is, for example, proportional to the actuating travel.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
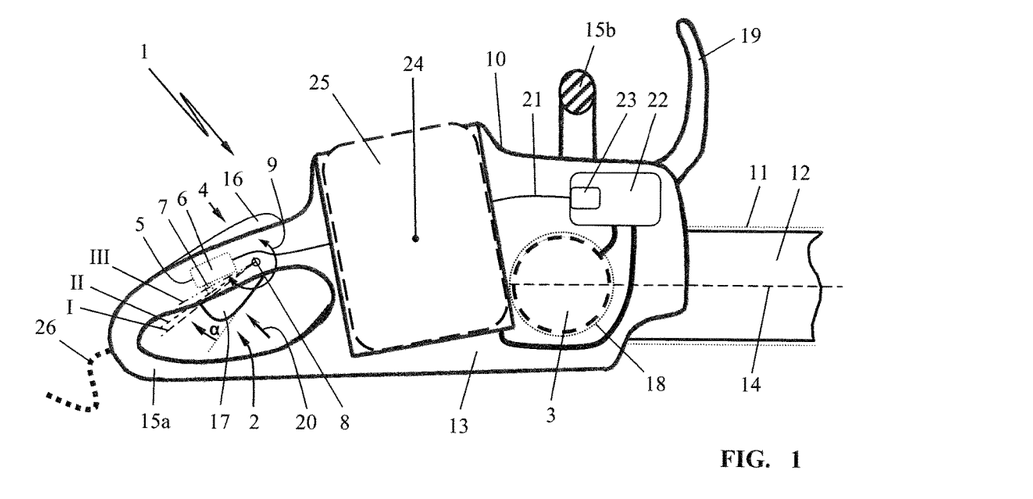
FIG. 1 shows a schematic of an electric motorized chainsaw.
Figure 2:
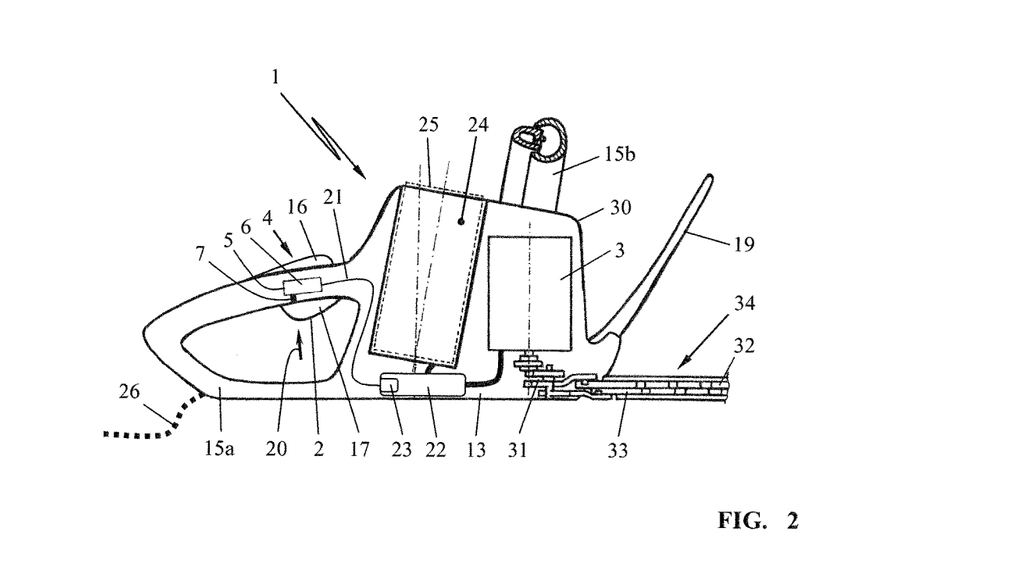
FIG. 2 shows a schematic of an electric hedge trimmer.

In FIGS. 1 and 2, a motorized chainsaw 10 and a hedge trimmer 30 are represented as examples of handheld work apparatuses with an electric motor 3. Other handheld work apparatuses can be, for example, a blower apparatus, a brush cutter, an electric trimmer or the like.

FIG. 1 shows a schematic of the portable handheld work apparatus 1 in the form of a motorized chainsaw 10 having an electric motor 3 provided in its housing 13. The electric motor 3 drives, preferably directly, a saw chain 11 which is guided so as to run round on a guide rail 12.

The housing 13 of the work apparatus 1 has in the embodiment a rear handle 15a which extends in the direction of the longitudinal axis 14 of the work apparatus. A grip sensor 4 in the form of a blocking lever 16 is provided on the rear handle 15a; the blocking lever 16 interacts with a throttle lever 17 which forms the actuation element 2 for activating the electric motor 3. The activation of the electric motor 3 corresponds to the activation of the work apparatus 1.

In an embodiment according to FIG. 1, the actuation element 2 acts on an electric actuating element 5 which is preferably embodied as an electric switch 6, preferably with an integrated potentiometer. The electric actuating element 5 includes an actuating pin 7 which is actuated by the actuation element 2 or the throttle lever 17. The actuating travel such as the actuation stroke 27 of the actuation element 2 or the return stroke 28 thereof can easily be detected by means of the switch 6 and/or a potentiometer. Via a switch and/or a potentiometer corresponding electrical signals which can be easily further processed and/or evaluated are generated during the actuation stroke 27. If only a switch 6 is used, the fact that a specific actuating travel of the actuation element 2 has been reached is indicated by the opening or closing of a contact of the switch 6. This can occur both in the case of the actuation stroke 27 and in the case of the return stroke 28.

If, instead of the switch 6, a potentiometer is used to detect the actuating travel of the actuation element 2, a signal which corresponds to the actuating travel of the actuation element 2 can be made available to the control unit 22; this signal can be, for example, a signal which is proportional to the actuating travel of the actuation stroke 2.

If a switch 6 is combined with a potentiometer, for example, arranged in a common housing, in order to detect the actuating travel of the actuation element 2, a first actuating travel, for example, a predefined actuation stroke 27, can be indicated by opening or closing a contact of the switch 6; the further actuating travel, for example, a further actuation stroke 27, is then signaled to the control unit 22 by a signal which is, for example, proportional to the actuating travel, and is evaluated in the control unit 22.

The electric actuating element 5 is permanently arranged in the handle 15; the actuation element 2 is pivotable about a pivoting axis 8 in the direction of the double arrow 9. Pressing down on the actuation element 2 in the actuation direction 20 presses the actuating pin 7 down, with the result that the switch 6 is actuated and the integrated potentiometer is adjusted by means of the subsequent actuation stroke 27.

The electric actuating element 5 is connected to a control unit 22 via an electric signal line 21. The operating signal of the electric actuating element 5 is evaluated in an evaluation unit 23. The evaluation unit 23 outputs a control signal to the control unit 22 if predefined evaluation conditions are satisfied.

The control unit 22 controls the supply of energy from a voltage source 24, which is formed by an accumulator pack 25 in the embodiment according to FIG. 1. Instead of the accumulator pack 25, the work apparatus 1 can be connected to an external voltage supply system via a supply line 26.

The control unit 22 feeds the energy necessary for operation to the electric motor 3 as a function of the operating position of the actuation element 2.

The output shaft of the electric motor 3 can be braked by means of a safety brake 18 (not illustrated in more detail). A hand guard 19, which is arranged in front of a front handle 15b, serves as a trigger for the safety brake 18. The front handle 15b engages over the housing 13.

The handheld work apparatus according to FIG. 2 is a hedge trimmer 30 which corresponds in terms of basic configuration to that according to FIG. 1; identical reference symbols are used for identical parts.

The hedge trimmer 30 has a housing 13 in which an electric motor 3 is arranged. The electric motor 3 drives, preferably via an eccentric drive 31, cutting blades 32, 33 which are guided on a cutter bar 34 and secured thereto. The hedge trimmer 30 has a rear handle 15a in which an actuation element 2 for an electric actuating element 5 is arranged. The electric actuating element 5 is formed by a switch 6 in which preferably a potentiometer is also integrated. The electric actuating element outputs an operating signal via the potentiometer as a function of the stroke of the actuation element 2.

The electric actuating element 5 is connected to a control unit 22 via an electric signal line 21. The operating signal of the electric actuating element 5 is evaluated in an evaluation unit 23. The evaluation unit 23 outputs a control signal to the control unit 22 if the actuation element is actuated in a predefined sequence of movements.

The control unit 22 controls the supply of energy from a voltage source 24, which is formed by an accumulator pack 25 in the embodiment according to FIG. 2. Instead of the accumulator pack 25, the work apparatus 1 can be connected to an external voltage supply system via a supply line 26.

The control unit 22 feeds the energy necessary for operation to the electric motor 3 as a function of the operating position of the actuation element 2.

In the embodiments according to FIGS. 1 and 2, the actuation element 2 rotates about a pivoting axis 8, for which reason the actuation stroke 27 corresponds to a rotational angle a about the pivoting axis 8, as illustrated in FIG. 1.

The actuation element 2 can, however, also be an actuation element which is moved in a translatory fashion or an actuation element which is guided along any desired curved path.

If the electrical work apparatus 1 is activated, the voltage source 24 is firstly switched on; this can be done by inserting the accumulator pack 25 into the receptacle shaft of the housing 13 or by plugging the supply line 26 into a socket.

When the voltage source 24 is made available, voltage is present at the electric actuating element 5 as well as at the control unit 22. The electric motor 3 is voltage-free; the electric motor 3 is off.

In order to prevent unintended pressing down of the actuation element 2 causing the electric motor 3 to start, and therefore causing the tool of the work apparatus 1 to start, the actuation element 2 must be operated in a predefined way. This is represented by way of example in FIG. 4.

Figure 4:
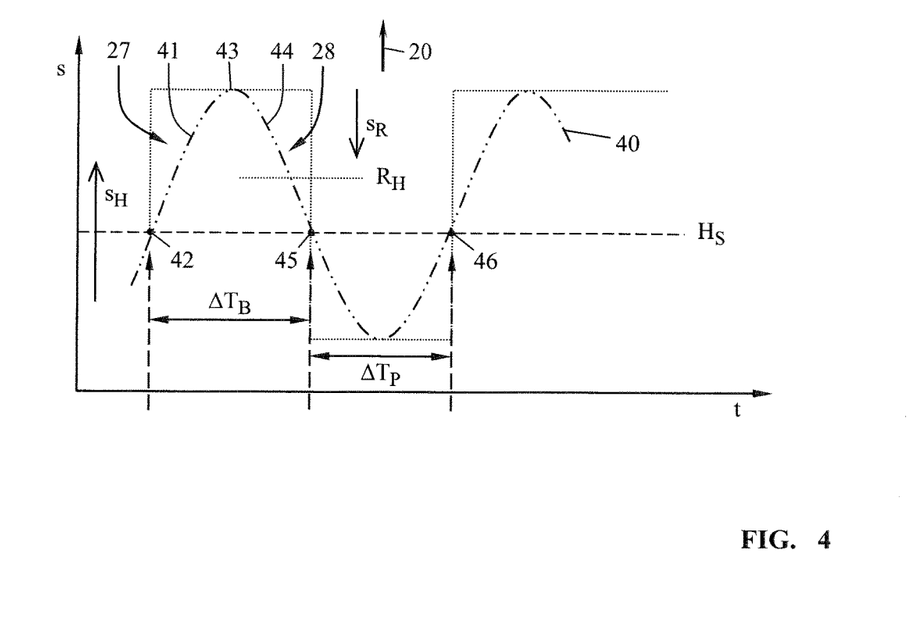
FIG. 4 shows a schematic of the actuation stroke of an actuation element over time.

After the voltage source 24 has been switched on, the control unit 22 is in the blocking state. The electric motor 3 is stationary and is voltage-free. In this blocking state, the control unit 22 blocks the supply of electrical energy from the voltage source 24 to the electric motor 3 irrespective of what position the actuation element 2 is in and of what operating signal is fed to the control unit 22 or the evaluation unit 23 via the signal line 21.

In order to switch the control unit 22 into a standby state so that a supply of energy to the electric motor 3 becomes possible, the actuation element 2 must be touched, that is, moved, in accordance with the illustration in FIG. 4.

In FIG. 4, a stroke threshold $H_S$ of the electric actuating element 5 is represented; this stroke threshold $H_S$ can be the switching on of the switch 6. When the stroke threshold $H_S$ is reached, the switch 6 of the electric actuating element 5 is actuated, preferably closed.

The stroke curve 40 in FIG. 4 represents the movement of the actuation element 2 in the actuation direction 20. When the actuation element 2 is pressed down, the rising branch 41 of the stroke curve 40 is passed through, wherein at the point 42 the switch 6 of the electric actuating element 5 switches. The stroke threshold $H_S$ is passed through up to a maximum 43, wherein the maximum can be the end stop of the potentiometer which is integrated in the electric actuating element 5. After a maximum 43 of the actuation stroke 27 has been reached, in a return stroke 28 the falling branch 44 is passed through until a predefined return stroke is reached.

The actuation stroke 27 from the point 42 up to the maximum 43 advantageously corresponds to the return stroke 28 from the maximum 43 up to the point of intersection 45 of the stroke curve 40 with the stroke threshold $H_S$. The actuation stroke 27 corresponds to the return stroke 28.

There is provision that the actuation stroke 27 and the return stroke 28 have to be carried out within an actuation time $\Delta T_B$. This can easily be monitored by virtue of the fact that the switch 6 which is provided in the electric actuating element 5 switches on, for example, at the point 42 and switches off, for example, at the point 45. A switching hysteresis of the switch 6 which occurs can be ignored.

This movement of the actuation element 2 within an interval time $\Delta T_P$ which is provided is monitored by the evaluation unit 23. If both the actuation stroke 27 and the return stroke 28 are carried out within the actuation time $\Delta T_B$, the evaluation unit 23 outputs a control signal to the control unit 22 in order to switch the control unit 22 from its blocking state into a standby state in which a supply of energy to the electric motor 3 is possible as a function of the position of the actuation element 2.

In order to change from the standby state into the operating state of the control unit 22 and to activate the electric motor 3, the stroke threshold $H_S$ must be exceeded again within a predefined interval time $\Delta T_P$ after the occurrence of the control signal, the stroke threshold $H_S$ being exceeded at the point 46 in FIG. 4. If the point 46 of the stroke curve 40 is reached within the predefined interval time $\Delta T_P$, the control unit 22 feeds energy to the electric motor 3 in the operating state and therefore activates the electric motor 3. The tool of the work apparatus is driven. The user can operate with the work apparatus 1.

Figure 5:
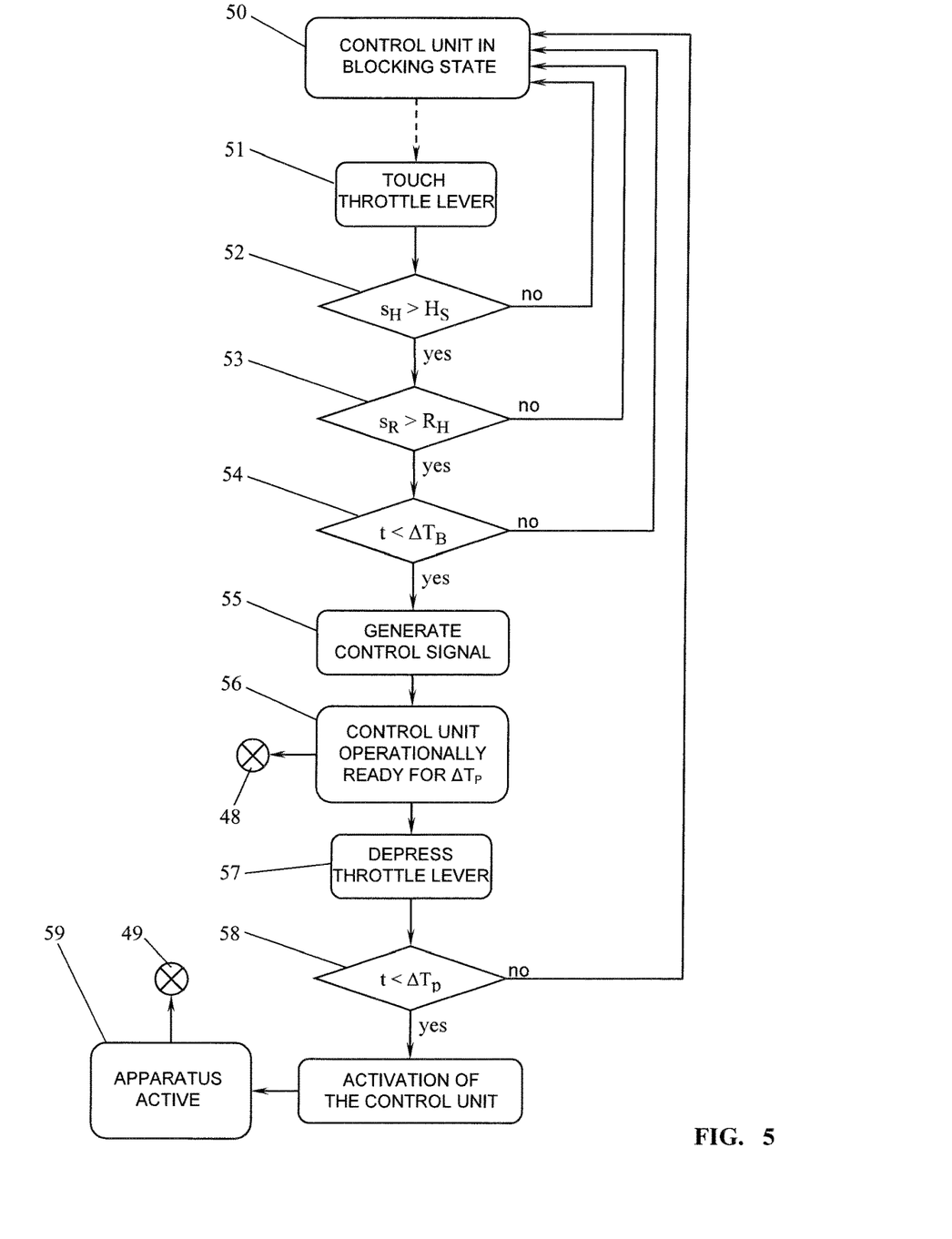
FIG. 5 shows a flowchart relating to the generation of a control signal for activating the work apparatus; and, FIG. 6 shows a flowchart relating to the activation of an electric work apparatus.

FIG. 5 shows a flowchart which represents the sequence for the activation of the control unit 22 from the blocking state into the operating state.

The control unit 22 is in the blocking state in field 50. By touching the throttle lever 17, as represented in field 50, the actuation element 2 is moved in the way provided in FIG. 4, in order to cause the evaluation unit 23 to output a control signal to the control unit 22.

Initially, the travel $S_H$ of the actuation stroke 27 must be so large that the stroke threshold $H_S$ is exceeded. This is interrogated in the decision rhombus 52.

If the condition according to which the actuation stroke 27 has exceeded the stroke threshold $H_S$ is satisfied, it is checked whether the return stroke 28 exceeds a predefined travel $R_H$. The return stroke 28 can be as large as the actuation stroke 27. The threshold $R_H$ of the return stroke 28 can correspond to the stroke threshold $H_S$ of the actuation stroke 27.

If the condition according to which the return stroke 28 has passed through a predefined travel $S_R$ and exceeded the threshold is also satisfied, it is checked whether the actuation stroke 27 and the return stroke 28 have taken place within an actuation time $\Delta T_B$. This is interrogated in the decision rhombus 54. If this is the case, the evaluation unit 23 generates a control signal which is represented in the field 55.

In response to the control signal of the evaluation unit 23, the control unit 22 switches to being operationally ready, but this is the case only for a predefined interval time $\Delta T_P$; this is represented in field 56.

The standby state of the control unit is preferably indicated by a visual display 48; the visual display 48 is expediently an LED.

The standby state of the control unit 22 is, according to field 56, maintained only for a predefined interval time $\Delta T_P$. This time period can be 1 second to 5 seconds long.

If the throttle lever 17 or the actuation element 2 is pressed, which is specified in field 57, it is checked whether this takes place within the predefined interval time $\Delta T_P$. If this is the case, in accordance with the decision rhombus 58 the control unit 22 is activated; the machine is active, as indicated in the field 59. The active machine can be indicated via a visual display 49, which is advantageously embodied as an LED.

The visual display 48 and the visual display 49 are expediently formed by one and the same LED. If the control unit is operationally ready the LED will flash; if the machine is active the LED lights up continuously.

If it is detected in the decision rhombuses 52, 53, 54 and 58 that the interrogated condition is not satisfied, the decision rhombus 52, 53, 54 or 58 branches back to the field 50 via a "no" branch; the control unit 22 drops back into the blocking state.

Figure 6:
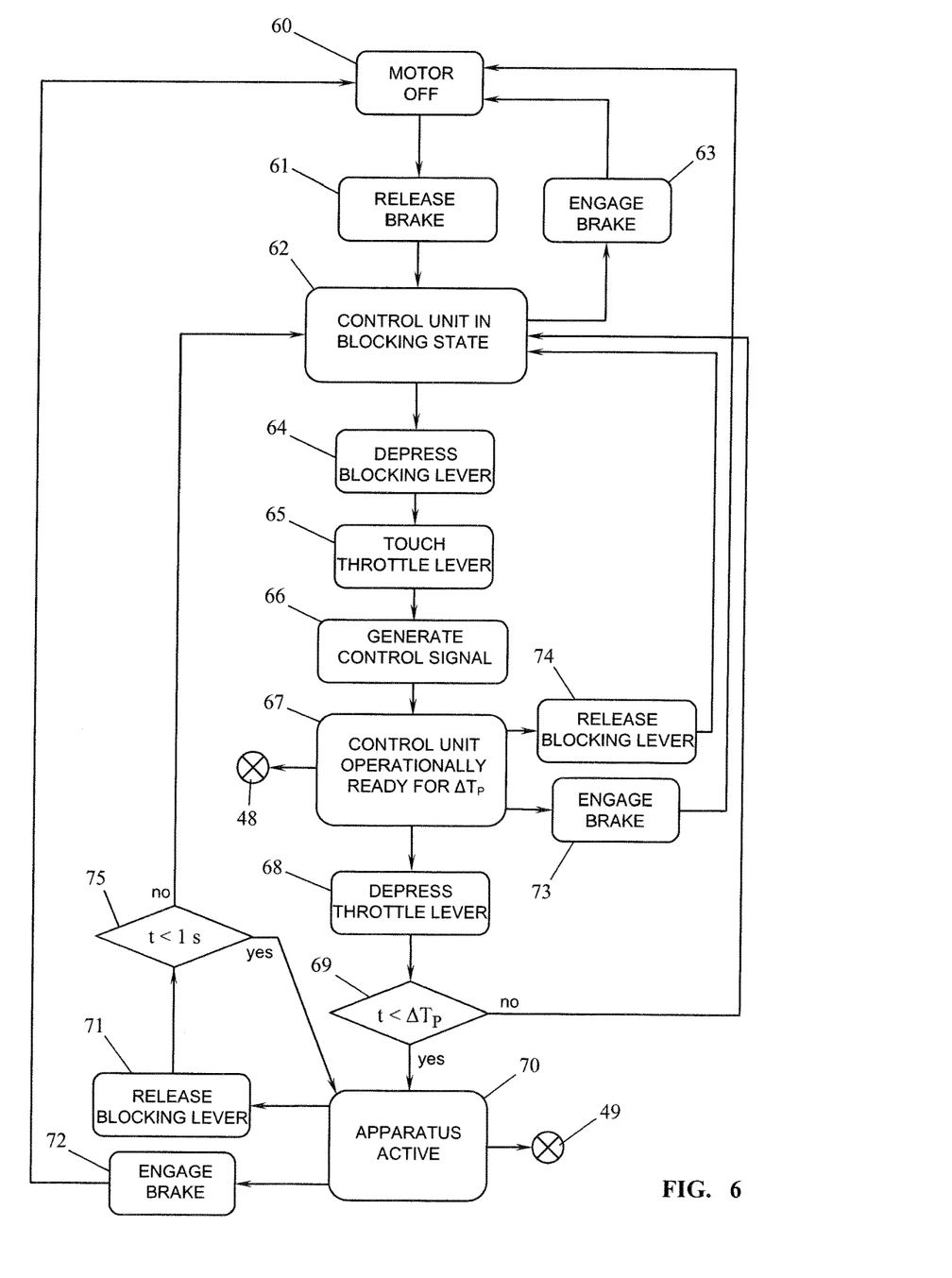

The activation of the work apparatus 1 is explained by way of example using the example of the motorized chainsaw 10 according to FIG. 1, with reference to FIG. 6.

As indicated in the output field 60, the motor 3 is off. If the safety brake 18 is triggered, as indicated in field 61, by actuating the hand guard 19, the control unit 22 goes into its blocking state. This is shown in field 62. If the brake is engaged again (field 63), the motor 3 remains off; the field 63 branches back to the field 60.

Starting from the control unit 22 in the blocking state, as represented in field 62, the blocking lever 16 must firstly be actuated in order to release the actuation element 2, in the embodiment the throttle lever 17. The pressing of the blocking lever 16 is indicated in the field 64. After the actuation element 2, in the embodiment the throttle lever 17, has become free, it must be actuated in a predefined movement sequence, as has been described in conjunction with FIG. 5. This is represented by "touch throttle lever" in field 65.

If the throttle lever 17 or the actuation element 2 has been successfully moved in a predefined fashion, a control signal is generated by the evaluation unit 23, as shown in field 66.

The control signal switches the control unit 22 into a standby state for a predefined interval time $\Delta T_P$. This is represented in field 67.

Within the predefined interval time $\Delta T_P$, the throttle lever 17 or the actuation element 2 must be pressed in order to activate the electric motor 3, as specified in field 68. The actuation of the throttle lever 17 within the permissible interval time $\Delta T_P$ is interrogated by means of the decision rhombus 69. If the predefined interval time $\Delta T_P$ has not been exceeded, the electric motor 3 is activated by the control unit 22; the machine is active.

Both the standby state of the control unit in accordance with field 67 and the active machine in accordance with field 70 are signaled to the user by a visual display (48, 49); the visual displays (48, 49) can be formed by a common LED which flashes in a first state and lights up continuously in a second state.

If the user releases the blocking lever 16 in the standby state of the control unit 22 in accordance with the field 67, the control unit 22 returns to the blocking state.

If the safety brake 18 is engaged in the standby state of the control unit, the electric motor 3 is continuously switched off; the control unit 22 returns to the blocking state (field 62) only after the brake has been released (field 61).

If in accordance with field 68 the throttle lever 17 or the actuation element 2 is pressed outside the predefined interval time $\Delta T_P$, the control unit 22 will drop back again into the blocking state in accordance with the "no" branch.

If the machine is active in accordance with field 70 and if the user releases the blocking lever 16, which serves as a grip sensor 4, as indicated in field 71, the control unit 22 can return without delay to the blocking state; in this blocking state the control unit 22 will block the supply of electrical energy to the electric motor 3 independently of an operating signal of the actuation element 2.

An intermediate field 75, which represents a timing element, is advantageously provided between the field 71 and the field 62. If the user releases the blocking lever 16 as a grip sensor 4, the timing element of the intermediate field 75 is started. The control unit is not switched back into the blocking state until after expiry of a predefined time period which can be, in particular, 1 second. As a result, the user is provided with the possibility of changing the gripping position of his hand on the operator control handle without the control unit dropping back into the blocking state. This facilitates work with changing working positions.

If the safety brake 18 is engaged when the machine is active, complete switching off of the motor takes place without delay; the field 72 branches back to the field 60. The control unit returns to the blocking state in accordance with field 62 only if the brake is released (field 61).

If the blocking lever 16 is released when the control unit 22 is operationally ready (field 67), as represented by field 74, the control unit 22 enters the blocking state.

If the safety brake 18 is engaged, as represented in field 63, when the control unit 22 is switched to the standby state (field 67), the system branches to the initial field 60. The electric motor is switched off.

The stroke threshold $H_S$ of the actuation element 2 can be indicated to the user via haptic measures. It is therefore expediently possible for an increased spring force to act on the actuation element 2 with the stroke threshold $H_S$, with the result that when the actuation element 2 is actuated in the actuation direction 20 the user can "feel" the stroke threshold $H_S$. This facilitates intentional switching on of the work apparatus.

Figure 3:
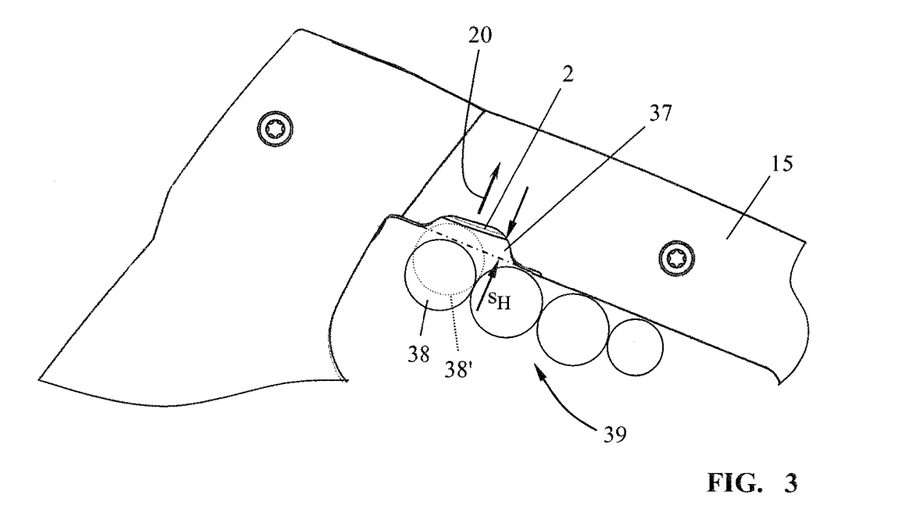
FIG. 3 shows a schematic of an actuation element which is arranged in a handle.

In another embodiment of the invention it is possible, as represented in FIG. 3, for a switching depression 37 to be formed in the handle 15; the switching depression 37 is of a size which corresponds approximately to the width of a finger 38 of a user's hand 39. In order to activate the work apparatus, the user must intentionally engage in the switching depression 37 with a finger 38, in order to move the actuation element 2 beyond a stroke threshold $H_S$ in the actuation direction 20. For the activation of the device, the user must therefore targetedly carry out certain actions in order to be able to activate the work apparatus; as a result unintentional switching on of the work apparatus can be avoided.

An expedient actuation time $\Delta T_H$ within which an actuation stroke 27 and a return stroke 28 have to be carried out is in the range between 50 milliseconds and 1 second. In this context, the travel $S_H$ of the actuation stroke can be 40% to 90% of the structural actuation stroke 27 of the actuation element 2. This structural actuation travel is provided between the positions I and II in FIG. 1. The position III represents a possible stroke threshold $H_S$.

The stroke threshold $H_S$ can be provided at any desired point within the structural actuation stroke. In the embodiment according to FIG. 3, the stroke threshold will be located towards the end of the actuation stroke 27; in the embodiment according to FIG. 4 the stroke threshold $H_S$ can be located approximately in the center of the actuation stroke 27.

It is understood that the foregoing description is that of the preferred embodiments of the invention and that various changes and modifications may be made thereto without departing from the spirit and scope of the invention as defined in the appended claims.

What is claimed is:

1. A method for activating a handheld work apparatus having an electric motor; a voltage source for operating the electric motor; a handle; a manual actuation member disposed on said handle and configured to be operated by a user for activating the work apparatus; a control unit; the manual actuation member being connected to the control unit and configured to output an operating signal; the control unit being configured to control the energy supply from the voltage source to the electric motor in dependence upon the operating signal of the manual actuation member; the control unit having a blocking state wherein the control unit is configured to block the supply of energy to the electric motor regardless of the operating signal of the manual actuation member; the method comprising the steps of:
   deriving a control signal from a combination of an actuating stroke of the actuating member and an actuating time ($\Delta T_B$) of the actuating member;
   generating the control signal when, within the predefined actuating time ($\Delta T_B$), the actuating member has performed a predefined actuating stroke in an actuating direction beyond a stroke threshold ($H_S$) and a predefined return stroke in a return direction opposite to the actuating direction; and,
   switching the control unit out of the blocking state and into a standby state after receiving the control signal so as to enable an energy supply to the electric motor.

2. The method of claim 1, wherein the stroke threshold ($H_S$) is crossed within the predefined return stroke.

3. The method of claim 1, wherein the control signal is only generated when the stroke threshold ($H_S$) is crossed a second time in the actuating direction after the return stroke.

4. The method of claim 3, wherein the control signal is only generated when the second time crossing the stroke threshold (HS) occurs within a predefined pause-time ($\Delta T_P$) after the crossing of the stroke threshold ($H_S$) in the return direction.

5. The method of claim 1, wherein the actuating time ($\Delta T_B$) lies in a range from 50 milliseconds to 1 second.

6. The method of claim 1, wherein the actuating stroke corresponds to 40% to 90% of a composite actuating stroke (I; III) of the actuating member.

7. The method of claim 1 further comprising the step of switching the control unit back to the blocking state when no operating signal is received within a predefined pause-time ($\Delta T_P$) after the occurrence of the control signal.

8. The method of claim 7, wherein the pause-time ($\Delta T_P$) lies in a range between 1 and 5 seconds.

9. The method of claim 1, wherein:
   the handle has a grip sensor configured to output a presence signal when a hand of the user is present; and,
   the control signal is only generated when the grip sensor is outputting a presence signal.

10. The method of claim 9 further comprising the step of:
   switching the control unit back into the blocking state when the presence signal of the grip sensor ceases.

11. The method of claim 10, wherein the control unit only switches back to the blocking state after a predefined amount of time has passed and the presence signal of the grip sensor remains dormant.

12. The method of claim 1, wherein the actuating stroke of the actuating member and the return stroke of the actuating member are the same.

13. The method of claim 1 further comprising the step of displaying the standby state via an optical display.

14. The method of claim 13, wherein the optical display is an LED.

15. A handheld work apparatus comprising:
an electric motor;
a voltage source configured to supply energy to said electric motor;
a handle;
a manual actuating member disposed on said handle and configured to be operated by a user of the work apparatus for activation of the work apparatus;
a control unit;
said manual actuating member being connected to said control unit and configured to output an operating signal;
said control unit being configured to control the energy supply from said voltage source to said electric motor in dependence upon said operating signal;
said control unit being further configured to block the energy supply to said electric motor independently of said operating signal of said manual actuating member;
said control unit being further configured to switch out of said blocking state into a standby state after receiving a control signal so as to allow an energy supply to said electric motor;
said control signal being derived from a combination of an actuating stroke of said manual actuating member and an actuating time ($\Delta T_B$) of said manual actuating member; and,
said control signal being generated when said manual actuating member has performed a predefined actuating stroke beyond a stroke threshold ($H_S$) in an actuating direction and a predefined return stroke counter to said actuating direction within the predefined actuating time ($\Delta T_B$).

16. The work apparatus of claim 15, wherein said manual actuating member is configured to have an increased spring force acting thereagainst at said stroke threshold ($H_S$).

17. The work apparatus of claim 15, wherein:
said handle includes a handle housing having a switching depression formed therein; and,
said switching depression is associated with said stroke threshold ($H_S$) of said manual actuating member.

18. The work apparatus of claim 15 further comprising a grip sensor associated with said manual actuating member and configured to detect a hand of a user.

19. The work apparatus of claim 18, wherein said grip sensor is configured as an actuating lock for said manual actuating member.

20. The work apparatus of claim 15, wherein said manual actuating member defines a positioning path; and, the work apparatus further comprising:
at least one of a switch and a potentiometer configured to determine said positioning path.

* * * * *

UNITED STATES PATENT AND TRADEMARK OFFICE
CERTIFICATE OF CORRECTION

| | |
|---|---|
| PATENT NO. | : 10,293,445 B2 |
| APPLICATION NO. | : 15/266988 |
| DATED | : May 21, 2019 |
| INVENTOR(S) | : O. Gerstenberger et al. |

Page 1 of 1

It is certified that error appears in the above-identified patent and that said Letters Patent is hereby corrected as shown below:

In the Specification

In Column 6:
Line 10: delete "angle a" and insert -- angle α -- therefor.

In the Claims

In Column 10:
Line 33: Claim 4 delete "(HS)" and insert -- ($H_S$) -- therefor.

In Column 10:
Line 52: Claim 9 delete "a presence signal" and insert -- the presence signal -- therefor.

Signed and Sealed this
Fifth Day of May, 2020

Andrei Iancu
*Director of the United States Patent and Trademark Office*